(12) United States Patent
Austman et al.

(10) Patent No.: US 7,076,261 B2
(45) Date of Patent: Jul. 11, 2006

(54) SYNCHRONIZATION OF OPTICAL SIGNALING BEACONS

(75) Inventors: Eric Austman, Winnipeg (CA); Tony Havelka, Winnipeg (CA)

(73) Assignee: ComSonics, Inc., Harrisonburg, VA (US)

( * ) Notice: Subject to any disclaimer, the term of this patent is extended or adjusted under 35 U.S.C. 154(b) by 426 days.

(21) Appl. No.: 10/609,625

(22) Filed: Jul. 1, 2003

(65) Prior Publication Data

US 2005/0003774 A1 Jan. 6, 2005

(51) Int. Cl.
*H04B 7/01* (2006.01)
*H04B 10/00* (2006.01)
*G01S 1/00* (2006.01)

(52) U.S. Cl. .................. 455/502; 455/230; 455/265; 455/41.2; 398/154; 342/385

(58) Field of Classification Search ............. 455/502, 455/515, 517, 426.1, 462, 465, 68, 70, 151.2; 375/354, 356–371; 370/338, 350, 520; 398/154, 398/155, 156
See application file for complete search history.

(56) References Cited

U.S. PATENT DOCUMENTS

| | | | | |
|---|---|---|---|---|
| 4,533,871 A | * | 8/1985 | Boetzkes | 340/10.2 |
| 5,677,927 A | * | 10/1997 | Fullerton et al. | 375/130 |
| 5,804,829 A | * | 9/1998 | Palmer | 250/504 H |
| 6,028,853 A | * | 2/2000 | Haartsen | 370/338 |
| 6,195,039 B1 | * | 2/2001 | Glass, Jr. | 342/357.09 |
| 6,295,461 B1 | * | 9/2001 | Palmer et al. | 455/557 |
| 6,571,111 B1 | * | 5/2003 | Mayo et al. | 455/574 |
| 2003/0067392 A1 | * | 4/2003 | Monroe | 340/573.1 |
| 2004/0008661 A1 | * | 1/2004 | Myles et al. | 370/350 |
| 2004/0233936 A1 | * | 11/2004 | Cheng | 370/509 |
| 2005/0068934 A1 | * | 3/2005 | Sakoda | 370/350 |

* cited by examiner

*Primary Examiner*—Duc M. Nguyen
(74) *Attorney, Agent, or Firm*—Whitham, Curtis, Christofferson & Cook, P.C.

(57) ABSTRACT

An arbitrary number of signaling beacons are synchronized simultaneously and automatically by a received modulated control signal in accordance with an arbitrary communication protocol over a communication link which may be separate from or superimposed upon a perceptible signal periodically provided from signaling beacons. The periodic perceptible signal may be stabilized using a crystal oscillator or an external transmitted signal such as a global positioning system (GPS) signal and synchronization thus maintained for extended periods of time even when the synchronization communication link is not available. Interference is substantially prevented by the communication protocol while supporting the provision of any desired beacon control functions.

18 Claims, 4 Drawing Sheets

SYNCHRONIZATION OF OPTICAL SIGNALING BEACONS

BACKGROUND OF THE INVENTION

1. Field of the Invention

The present invention generally relates to optical signaling beacons to indicate the locations of persons and/or objects and, more particularly, to arrangements for synchronizing the signaling operations of a plurality of such beacons.

2. Description of the Prior Art

Signaling beacons have been known for many years, particularly for purposes of navigation under adverse lighting conditions such as night or fog. Lighthouses are a particularly familiar example of signaling beacons used for such purposes over the last century and longer. In more recent times, a plurality of signaling beacons have been used together to indicate not only the location but the size and shape of an object, facilities or obstructions such as runways for aircraft, construction barriers, communication signaling towers and the like or even locations of personnel.

In these latter applications, however, it has been found desirable to provide a degree of common control to such beacons to enhance visibility of an object. In order to identify a light source as a signaling beacon and possibly to identify the object indicated, it is desirable that the light output be other than continuous and unchanging. For example, in regard to a single signaling beacon, a unique pattern of light flashing was used in lighthouses not only to distinguish the signaling beacon from other light sources, such as on other boats or on shore, but to identify particular lighthouses and distinguish them from each other. In applications utilizing a plurality of signaling beacons, synchronized flashing lights or particular or changing colors may be used. For example, flashing lights are often used in combination with constant, steady light beacons on communication towers and lights flashing in a sequence indicative of direction are often used for airport runways. The cooperative operation of plural beacons in such a manner not only unambiguously identifies the object but facilitates the visualization of its location, size, orientation and configuration. Unfortunately, large, complex and generally expensive systems are required to achieve such effects and are generally applicable only to fixed installations with a predetermined number of regularly spaced beacons to be synchronized.

On the other hand, there are numerous applications for signaling beacons which are temporary and where the number and arrangement of beacons is arbitrary and/or changeable such as in the case of highway construction barriers as alluded to above. In many such cases, it is important that the hardware used be very simple, rugged and inexpensive due to the potentially large number of beacons required, the need for quick and simple installation by personnel not trained for sophisticated electrical or electronic installations and the relatively high likelihood of damage to or theft of individual signaling beacons. Therefore, there is generally no provision for synchronization of signaling beacons of this type. The resultant free-running flashing, even if accurately clocked at each beacon, tends to result in flashing in a substantially random order; yielding a "twinkling" effect overall which tends to inhibit the ability to easily and accurately visualize the pattern being marked by the signaling beacons or to identify the individual beacons as related in function or purpose. Moreover, in applications such as highway construction barriers where the array of signaling beacons is generally linear and first seen from a vantage point substantially colinear with the array, the blinking or flashing of individual signaling beacons may be obscured and inhibit recognition of the light as that of signaling beacons.

Attempts have been made to provide synchronization of such separated and free-running signaling beacons by accurate clocking and initial synchronization. However, such arrangements generally require the individual units to be brought into proximity with a given signaling beacon such that a synchronization connection or other physical contact can be made. Of course, this must be done for each signaling beacon to be deployed which presents a substantial inconvenience, particularly when it is considered that the time required to establish synchronization is, for simple systems, approximately equal to the cycle time of the beacon (e.g. often eight seconds or more). Moreover, after initial synchronization, the individual signaling beacons will operate in a free-running manner and, since the clocking arrangement is necessarily subject to drift, synchronization will invariably be lost and the twinkling or sparkling effect will be developed over a greater or lesser period of time depending on clock accuracy and stability; both of which are usually associated with increased cost.

Attempts to provide synchronization by gating the individual beacons with the detected light output of other signaling beacons has been generally complex and ineffective because of, among many possible reasons, the high likelihood that the observation or monitoring of other beacons may be ambiguous or obscured or subject to delays inherent in developing full light output or extinguishing it as the signaling beacon light is turned on and off as well as circuit delays and which may be cumulative across the system where synchronization control is serial from one beacon to the next. Such systems are also subject to interference from other light sources and distinguishing system light sources from other light sources such as by modulating the light output in accordance with a unique protocol is difficult. Such attempts at synchronization also require reliable and continuous communication links (e.g. line-of-sight) which may be very difficult if not impossible to reliably maintain, particularly in regard to personnel or movable objects.

It should be appreciated that slight deviation from synchronization (e.g. at the onset of the sparkling or twinkling effect and possibly before the difference in timing becomes evident in systems providing for initial synchronization) detracts significantly from the effect of a plurality of signaling beacons and perception of the object(s) or personnel which they mark or indicate. That is, any slight lack of uniformity or homogeneity in operation of beacons in a system is highly perceptible and tends to be perceived as different systems indicating application to different objects or personnel. This loss of uniformity is particularly critical in regard to indicating locations of personnel or objects which are movable, such as vehicles, aircraft or vessels.

Conversely, a perception of uniformity of operation of a plurality of signaling beacons is critical to recognition of the plurality of signaling beacons of arbitrary number and arrangement as constituting a single system or application. This is particularly true where individual signaling beacons are used to identify individual personnel or movable objects which must be distinguished from other personnel or movable objects (e.g. friend or foe discrimination) where it may even be attempted to emulate one system with another system. Uniformity of operation also assists in the perception of the array of beacons in applications such as route or boundary markers where the shape of the array is important, especially when the signaling beacons are operated with short duty cycle and/or long cycle times.

SUMMARY OF THE INVENTION

It is therefore an object of the present invention to provide a system for synchronization of signaling beacons which may be arbitrary in number and arrangement and which may be implemented at low cost.

It is another object of the invention to provide synchronization of a plurality of signaling beacons which achieves synchronization of any or all signaling beacons in reduced time and automatically while avoiding a need for a reliable and continuous line-of-sight communication link.

It is a further object of the invention to provide a system of low-cost signaling beacons in which the signaling time, rate and pattern may be easily and automatically controlled across the system.

It is yet another object of the invention to avoid any need for either a reliable and continuous line-of-sight communication link or any physical communication link between beacons, thus changing the time required for synchronization of beacons from order N (e.g. serial synchronization operations for all beacons) to order 1 (e.g. simultaneous synchronization of all beacons).

In order to accomplish these and other objects of the invention, a system of signaling beacons is provided wherein a signaling beacon of said system includes a timer providing timing signals, a controller for receiving the timing signals and controlling periodic energization of a signaling arrangement such as a visible or non-visible light source for providing a perceptible signal, and controls responsive to receipt of a periodic modulated synchronization signal from another signaling beacon for synchronizing the periodic energization of said signaling arrangement.

In accordance with another aspect of the invention, a method for synchronizing a system of signaling beacons including steps of providing periodic energization of a source of a perceptible signal at respective signaling beacons, transmitting a control signal in accordance with a communication protocol from a first signaling beacon, bringing a second signaling beacon within synchronization range of said control signal, and altering timing of the periodic energization of the second signaling beacon responsive to the control signal and the periodic energization of the first signaling beacon.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
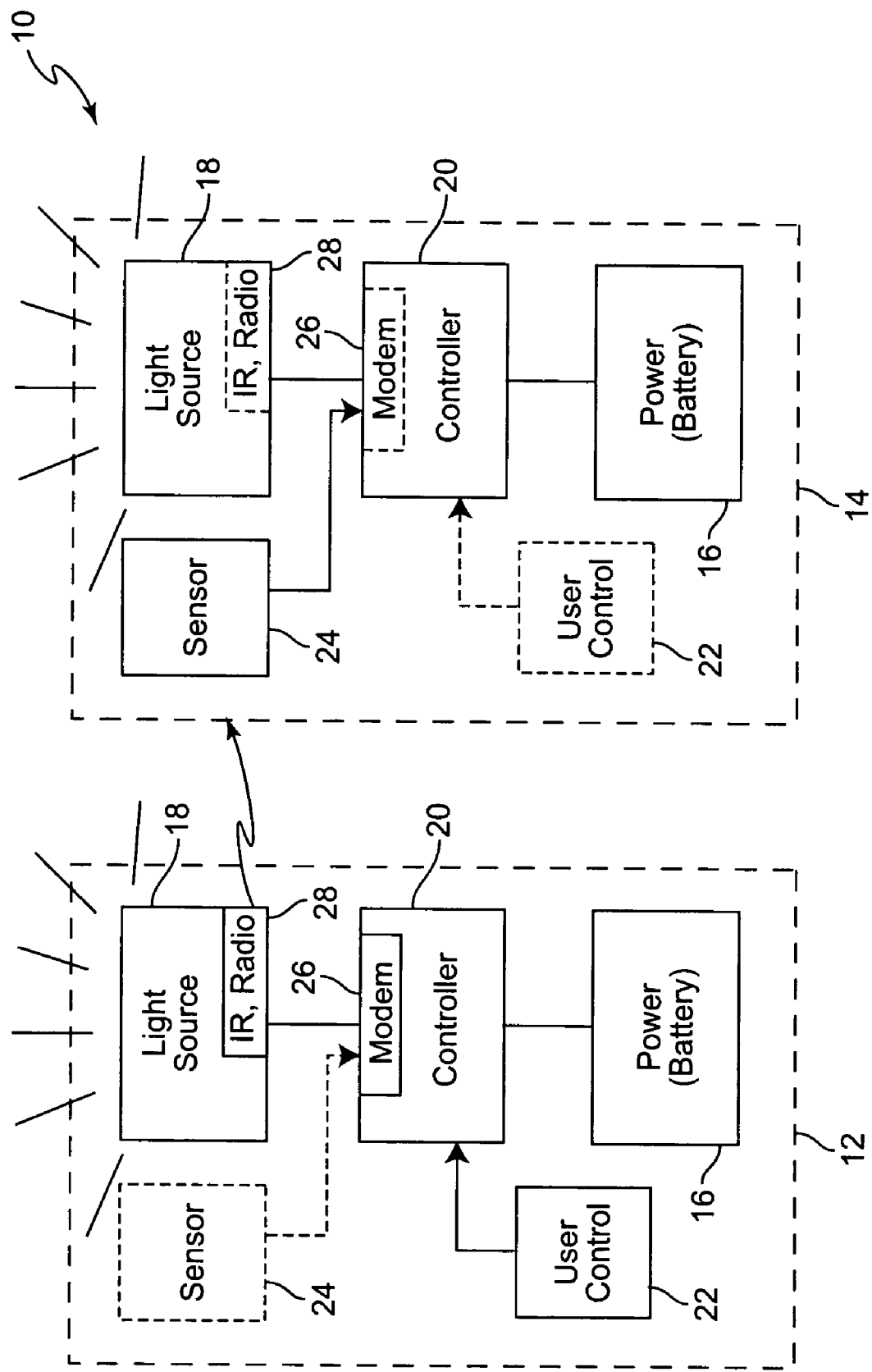
FIG. 1 is a high-level functional block diagram of two signaling beacons of a system of signaling beacons in accordance with the invention.

Referring now to the drawings, and more particularly to FIG. 1, there is shown a high-level block diagram of the synchronization system 10 of the invention. The system illustrated in FIG. 1 is limited to two signaling beacons 12, 14 in the interest of clarity but it is to be understood that the number of signaling beacons is arbitrary and may be very large.

Figure 2:
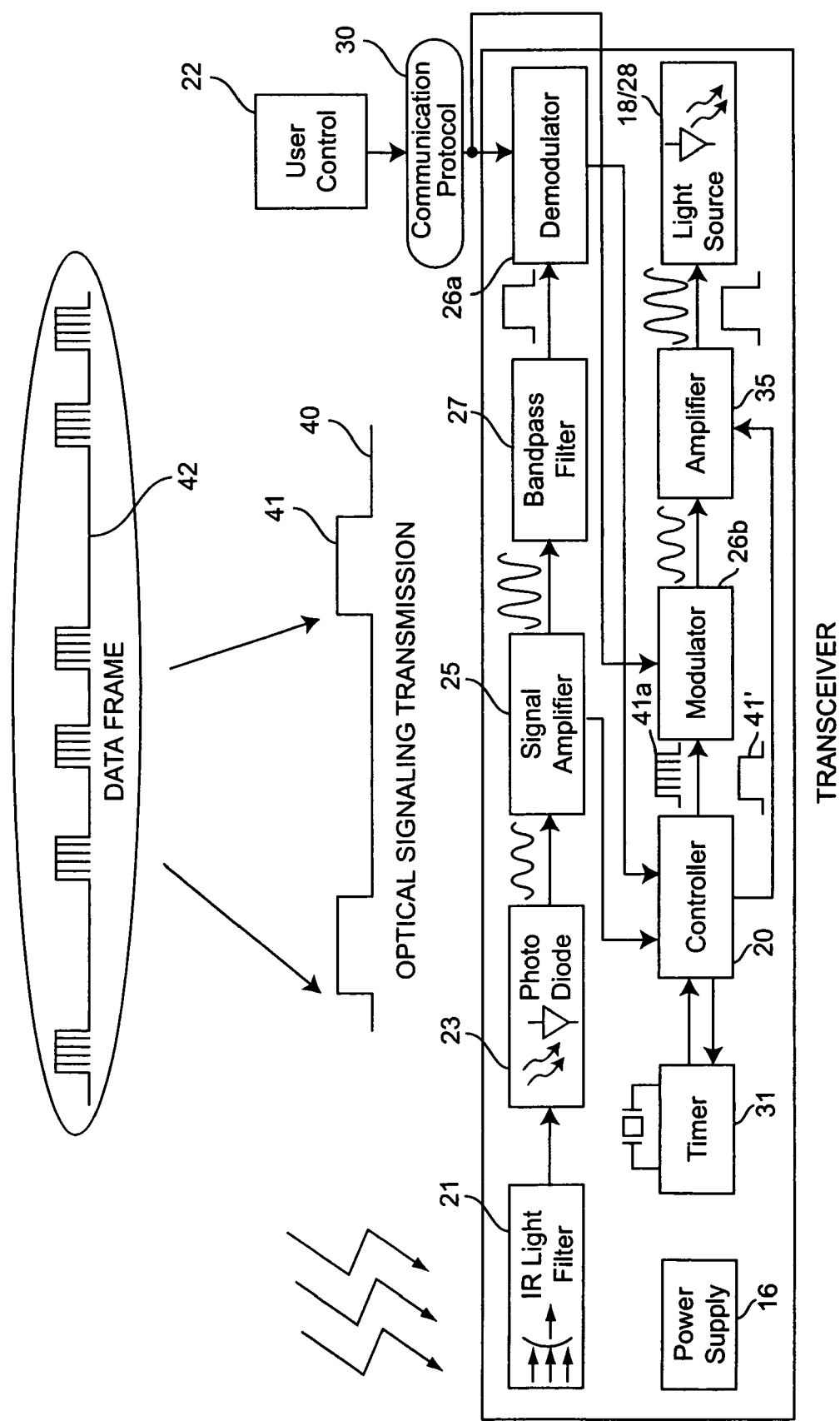
FIG. 2 is a functional block diagram of a preferred form of a transceiver signaling beacon in accordance with the invention.

The individual beacons may be of three functional forms: a transmitter beacon 12, a receiver beacon 14 and a transceiver or relay beacon which is a combination of transmitter and receiver beacons and depicted at both 12 and 14 of FIG. 1 by constituent elements illustrated with dashed lines in the respective beacon units 12 and 14 and, in more detail, in FIG. 2. By the same token, it is possible for all beacon units to be constituted identically and selectively controllable to function as transmitter, receiver and/or transceiver. However, it is preferred as a matter of economy to provide one beacon as a transmitter 12 (since at least one beacon capable of signal transmission is necessary in any synchronized system of beacons in accordance with the invention) and the remainder of the beacons as receivers for maximum economy or transceivers for maximum flexibility and redundancy. Of course, all beacon units can be configured as transceiver units which may also provide certain economies and convenience. In such a case, it is preferred to provide for a transceiver beacon unit to function as a master unit or slave or relay unit.

Regardless of function, all beacon units include a power supply 16, such as a battery, a signaling light source 18 (which may be comprised of a plurality of light emitting devices as well as reflectors, lenses and the like, as desired) and a controller unit 20. Transmitter beacon units may additionally include user controls 22, a modulating and demodulating arrangement or modem 26 for applying a coded signal in accordance with an arbitrary communication protocol to the output of light source 18 and/or a discrete communication arrangement 28 which may be, for example, another light source in the visible or non-visible spectrum (e.g. infrared), a short-range radio or ultrasonic transmitter or the like.

Similarly, in addition to a power source 16, light source 18 and controller 20, a beacon unit functioning as a receiver will include sensor 24 to receive transmitted signals and provide communicated synchronization information to controller 24. Further, in a receiver beacon unit, modulator 26 and optional communication transmitter 28 would normally be omitted. Of course, a transceiver beacon unit would preferably include all of user control 22, sensor 24, modulator 26 and, if used, optional communication transmitter 28 in order to selectively provide functions of a transmitter beacon unit and/or a receiver beacon unit.

Each signaling beacon is thus self-contained and physically independent of other beacon units and is capable of functioning as a signaling beacon in a free-running manner entirely independent of any other signaling beacon, for example, in an application where only a single signaling beacon is required. However, when a plurality of such beacons are used, synchronization of all such beacons is achieved through an arbitrary communications protocol and a communication link using light source 18 or arbitrary relatively short range communication medium/transmitter 28. Preferably an optical link using light source 18 is modulated in accordance with the chosen communication protocol only at a single transmitter beacon unit 12 which functions as a master beacon unit to which all other (e.g. receiver) beacon units are slaved.

However, it should be understood that, by the use of transceiver beacon units, the master beacon unit may be freely changed between beacon units of the system and/or other beacon units may be used as a repeater or relay unit where or when a direct communication to the master beacon unit is unavailable. In such a case, the communication protocol is preferably changed at such repeater or relay units to reduce the possibility of interference or ambiguity of control (e.g. feedback to the same beacon unit or reception of control signals from more than one master or relay unit). Control and synchronization signals are thus effectively broadcast and all units which receive the control and synchronization signals may be simultaneously automatically synchronized with the master beacon unit. Other beacon units are brought into synchronism with the master (and relay) beacon units immediately upon a communication link being established by bringing a beacon unit within synchronization range of a transmitting beacon, even if only briefly, such as for the duration of a single beacon cycle or data frame using light source 18 or even a small portion of a beacon cycle if transmitter 28 is used such that a data frame of reduced duration may be developed.

FIG. 2 shows a more detailed block diagram of a transceiver beacon unit in accordance with a preferred embodiment of the invention. The controller details may be implemented in hardware, software or a combination thereof and may be application dependent; ranging from very simple to highly complex, depending on protocol, robustness and security as well as flexibility of functions desired for the system. In the transceiver beacon as illustrated in FIG. 2, the sensor 24 of FIG. 1 is shown in an expanded, preferred form including an infrared filter 21, a photo diode 23, a signal amplifier 25 and a bandpass filter 27. Modem 26 is also shown in an expanded form comprising demodulator 26a and modulator 26b. Similarly, a timer 31 (which may be crystal-controlled or controlled by an external transmitted signal such as GPS, WWVB, WWV, WWVH or the like for stability, portions of which signals may also be used as a control or synchronization signal for the perceptible signal of the signaling beacon), implicit in controller 20 of FIG. 1 is separately shown. It is also preferable to provide an additional amplifier 35 to drive light source 18/28. However, it is to be understood that these additional elements and the details thereof are not critical to the practice of the invention and some elements may be omitted altogether in transmitter and receiver types of beacons in accordance with the invention, as discussed above.

In operation of a system in accordance with the invention, the master signaling beacon emits a signal which, if in the visible spectrum or otherwise perceptible by the senses would appear to have a periodic form depicted in waveform 40. However, the individual pulses thereof are modulated to contain control signals as generally depicted in waveform 42 such that each pulse in waveform 40 includes a plurality of modulated pulses in a time sequence which preferably, but not necessarily, provides information in a highly redundant format in the course of one or more data frames within a signaling pulse. In general, increased redundancy of information not only increases robustness and reliability of operation but may reduce the duration of the signal necessary to provide synchronization and desired control, depending on the complexity of the information, coding, encryption and the like. The nature of the modulation and communication protocol chosen are not important to the successful practice of the invention except to the extent that some readily detectable differences from the communication protocol of any similar system or source of detectable energy operating in the vicinity of the system should be provided so that potential interference can be rejected.

This communication signal, preferably infrared light, as illustrated, is passed by filter 21 and preferably detected by an energy sensor or transducer such as exemplary photo diode 23 which outputs a time-varying signal that is amplified by amplifier 25. The output of amplifier 25 is also preferably bandpass filtered by filter 27 to increase signal-to-noise ratio (SNR) and further reduce interference. This signal is then demodulated at demodulator 26a in accordance with the communication protocol 30 and user-specified controls 22 currently in use.

It should be understood that the communication protocol is usually implemented as a subset of controller algorithms and it is a function of controller 20 to reject interference from signals which do not correspond to the communication protocol currently in use. Therefore, the depiction of communication protocol 30 in FIG. 2 is to be understood as schematic and reflecting the possibility of user or system control thereof and/or the remote possibility of external input of such a communication protocol algorithm even though such external input is generally impractical and is not preferred.

It should also be understood that the amplitude modulation type modulation scheme depicted is not necessarily related to the communication protocol of the system but is only intended to be a physical interpretation and representation of the information which is transferred in accordance with the chosen communication protocol which is, itself, not critical to the practice of the invention. That is, the controller employs the communication protocol implementation and the modulator/demodulator units are used to shift the data stream in the frequency domain to increase the SNR of the information over the physical medium.

Controller 20 receives the output of the demodulator and amplified (and filtered, if desired) signal corresponding to the output of the photo diode 23. Two separate signal paths are shown to represent two types of data delivered to the controller 20: the basic timing signal corresponding to the master beacon operation (e.g. for human observation) and control signals which control such parameters as signaling carrier frequency, identifiers or particulars of the communication protocol, beacon signal parameters such as pattern, frequency, color and the like which further identify the beacon as part of the system and other information as may be required to support any of a plurality of operational features which may be desired, included in the system and controlled by controller 20 consistent with the basic principles thereof as will be evident to those skilled in the art and accommodated by a processor preferably used to constitute controller 20. Otherwise, to the extent that such parameters constitute features of the communication protocol and thus not controlled by the controller, control signals that represent parameters such as signaling carrier frequency and color (e.g. as used to identify communication link signals by the system as contrasted with system identification to an observer) need not be input to the controller since the transducer 23, filter 27 and demodulator 26a would control the throughput of the signal that satisfies such criteria and which are features of the communication protocol.

Conversely, it should be understood that controller 20 could comprise little more than registers to contain control information corresponding to the communication protocol and user specified controls, if any, and a programmable, resettable counter to divide the frequency of the system clock or timer 31 and restart the count in synchronism with received input pulses 41. Thus controller 20 provides output pulses 41a, representing a synchronous envelope of control signals, to modulator 33 and then to amplifier 35 and a signal 41' substantially identical to and in synchronization with received pulses 41 which is supplied directly to amplifier 35. Modulator 33 also may receive (optional) local user control 22 and communication protocol 30 (e.g. to change protocol at a relay beacon to prevent self-feedback) information and provides a modulated signal corresponding thereto as a synchronous burst having an envelope synchronized with pulse 41, in accordance with which light source 18/28 is driven. That is, the two signal paths 41a and 41' represent different types of data, which may share a degree of use and function in common. The output 41a of controller 20 which represents data and protocol information is sent to modulator 26b for modulation with a carrier frequency to increase the SNR for communication over the medium. The path that bypasses the modulator and is fed directly to the amplifier represents a larger time-scale output that controls the light source 18/28 according to the signaling pattern that is perceptible (e.g. with or without a sensory aid depending on use of visible or non-visible light, audible or ultrasonic tone, etc.) to observers. Thus one path, 41a, is modulated for beacon protocol communications and the other, 41', the long term beacon signaling pulse patterns, where the signaling pulses are, for example, interleaved with modulated data frames to synchronize the surrounding beacons.

Therefore, it is seen that a signaling beacon as illustrated in FIG. 2 can operate in a free-running manner in the absence of a synchronizing signal from a master or relay beacon and, when such a signal is received (e.g. by being brought within sight or range of the master or relay beacon), synchronization is achieved simultaneously and almost instantaneously by, for example, resetting a counter or register which is used for counting or dividing the frequency of timer 31. Thus the synchronization for an arbitrary number, N, of beacons is of order 1 rather than order N, as would be the case if a physical link were employed for initial synchronization. It should also be appreciated that, if the frequency of timer 31 is relatively stable and relatively resistant to frequency drift, reliability and continuity of the communication link becomes substantially less critical to system synchronization as will now be discussed.

Figure 3:
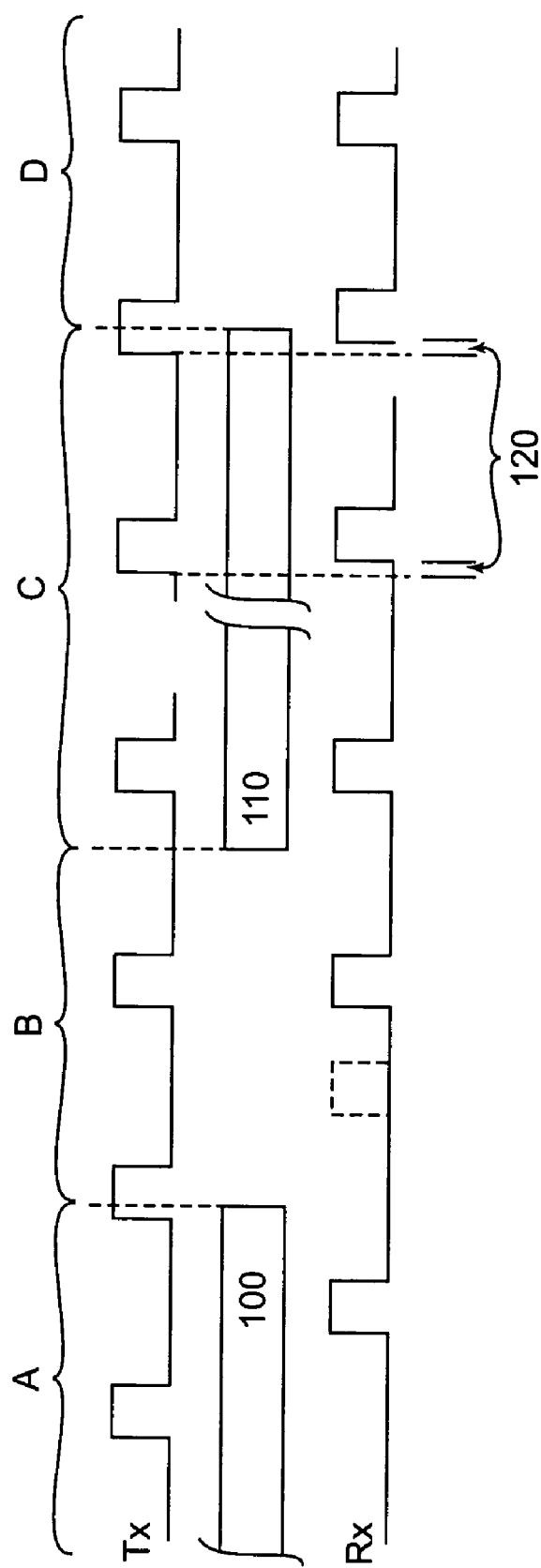
FIG. 3 is a diagram illustrating the synchronization operation of the invention.

Referring now to FIG. 3, a scenario is depicted in which the continuity of a communication path between a transmitter beacon and a receiver beacon is intermittent. FIG. 3 may be understood as a barrier having portions 100 and 110 which are interposed between a transmitter and receiver beacons which are moving from left to right. Thus FIG. 3 is divided into four time intervals A–D: interval A being prior to synchronization having been achieved, while a communication path exists and operation is synchronous during intervals B and D. However, during interval C which follows a period of synchronous operation in accordance with an existing communication path, the communication path is interrupted. However, synchronization is substantially maintained in a free-running mode due to the stability of timer 31 and which can be adjusted during periods of synchronized operation via communicated signals and other means to even further minimize frequency drift while free-running. Therefore, only a very small timing shift is likely to occur even over a quite extended period of time and is corrected immediately when synchronous operation is resumed at the onset of interval D when the communication path is restored, if only very briefly (e.g. long enough to observe a pulse 41 or a data frame therein). It has been found, using stabilized oscillators (e.g. controlled by a crystal element or an external signal) in timers 31, as alluded to above, that no perceptible loss of synchronism will occur in a free-running beacon (e.g. without a communication link) for periods of hours or days even though the timer is subject to drift when the beacon is operating in a free-running mode in the absence of a communication link. Conversely, to maintain adequate system synchronism, a communication link need only exist for a short period of time at similar intervals of hours or days.

In view of the foregoing, it is seen that a system of signaling beacons can be reliably and conveniently synchronized simultaneously even when a communication link may be difficult to reliably maintain such as where beacons are used in connection with mobile objects moving in an arbitrary domain with random obstructions. Synchronization is established in accordance with the invention over systems of arbitrary size, extent and array shape that may be extended or otherwise altered during operation while providing single beacons which are capable of independent operation as stand-alone units. The beacon units in accordance with the invention may be produced at low cost and are capable of a wide range of functions to enhance visibility and identification such as controllable flashing patterns while being simple and generally compatible with various desired enhancements that will be apparent to those skilled in the art, particularly for specific applications.

Figure 4:
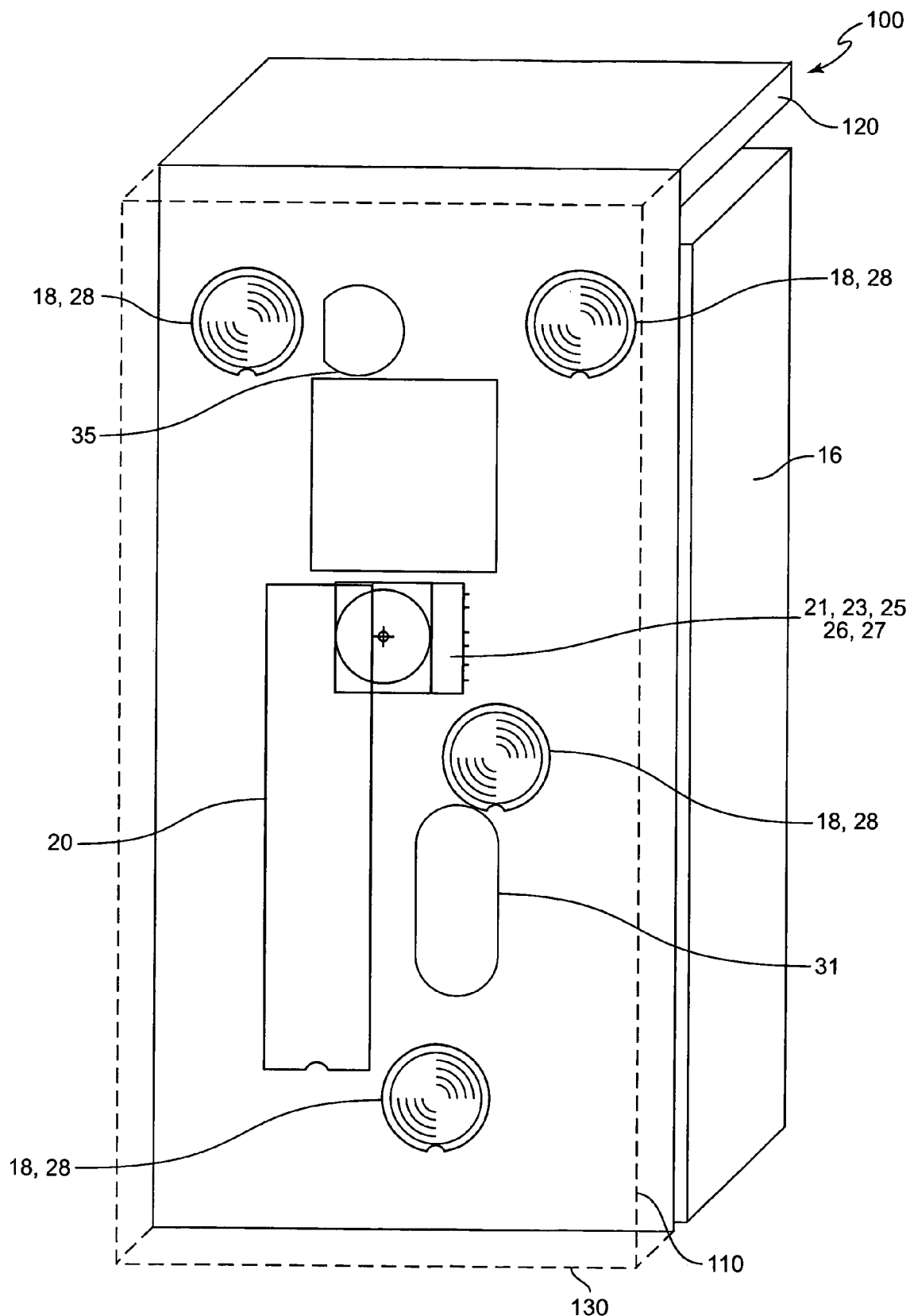
FIG. 4 is a preferred physical embodiment of the invention.

A preferred physical embodiment of a beacon in accordance with the invention will now be discussed with reference to FIG. 4. (The same reference numerals used in the above discussion of FIGS. 1 and 2 will be used.) The major portion of the volume of the beacon unit is constituted by power source battery 16. The remainder of the beacon is constructed on a circuit board which is preferably of an angled configuration with portion 120 covering and providing connection to the battery terminals and portion 110 covering an adjacent lateral side of the battery 16 and carrying the remainder of the electronic components of the beacon. This configuration is preferred since it is compact while providing ample space for the electronic components and providing directionality for the beacon. However, if an omnidirectional beacon is desired, the electronic components can be carried by portion 120 and portion 110 may be omitted. Dashed lines 130 depict an optional cover having apertures through which one or, preferably, more light sources 18, 28 which are preferably distinctively arrayed and transducer 21, 23 (possibly including demodulator 26a, amplifier 25 and filter 27 in the same component) may protrude. Alternatively, the cover may be transparent. In either case, provision of a cover is preferred to protect the electronic components such as controller/processor 20 from physical damage and foreign materials.

In such a preferred form, it is seen that a beacon in accordance with the invention can be made very similar in dimensions and weight to the battery 16 used to power it. The battery may be of any convenient size and capacity capable of powering the beacon for a desired period of time between replacement. A standard nine volt battery having snap terminals (which provide a convenient mechanical attachment for the beacon) has been found to be satisfactory in this regard for most applications, particularly when it is considered that the principal load is that of the light sources 18, 28 and power requirements may be diminished by reducing the duty cycle thereof. Very short duty cycles do not significantly reduce visibility of the beacons, particularly when operated in a synchronized array operated since visibility is substantially enhanced by the synchronization provided in accordance with the invention.

Thus, in view of the foregoing, it is seen that the invention provides simultaneous synchronization of a system of signaling beacons where the number and array of beacons is arbitrary. No physical link is required for synchronization and the optical, infrared, acoustic, radio, etc. communication link is only required for a short duration at potentially widely separated intervals. Any communication protocol may be used and may be freely chosen to provide any desired level of functionality and freedom from interference.

While the invention has been described in terms of a single preferred embodiment, those skilled in the art will recognize that the invention can be practiced with modification within the spirit and scope of the appended claims.

Having thus described the invention, what is claimed as new and desired to be secured by Letters Patent is as follows:

1. A system of signaling beacons, a signaling beacon of said system including
    a timer providing timing signals,
    a controller for receiving said timing signals and controlling periodic energization of a signaling means for providing a perceptible signal, and
    means responsive to receipt of a periodic modulated synchronization signal in accordance with a communication protocol from another signaling beacon to control said timer for synchronizing said periodic energization of said signaling means with said another signaling beacon.

2. A system as recited in claim 1, wherein said signaling means is a light source.

3. A system as recited in claim 1, wherein said signaling means is a non-visible radiation source.

4. A system as recited in claim 1, wherein said signaling means is an acoustic wave source.

5. A system as recited in claim 1, wherein said signaling means is a radio signal source.

6. A system as recited in claim 1, wherein said timer includes a crystal oscillator.

7. A system as recited in claim 1, wherein said timer is controlled by a radio signal.

8. A system as recited in claim 7, wherein said radio signal is a global positioning system (GPS) signal.

9. A system as recited in claim 1, wherein said signaling means provides said modulated synchronization signal superimposed on a perceptible signal.

10. A system as recited in claim 1, further including
    a communication link transmitting means for providing a modulated synchronization signal separate from said perceptible signal.

11. A system as recited in claim 1 wherein said communication protocol is one of a plurality of communication protocols and wherein said signaling beacon further includes means for transmission of a periodic modulated synchronization signal using a communication protocol which is changed from said communication protocol by which said periodic modulated synchronization signal is received from said another signaling beacon.

12. A method for synchronizing a system of signaling beacons, said method including steps of
    providing periodic energization of a source of a perceptible signal at respective signaling beacons of said system,
    transmitting a control signal in accordance with a communication protocol from a first signaling beacon of said system,
    bringing a second signaling beacon of said system within synchronization range of said control signal, and
    altering timing of said periodic energization of said second signaling beacon responsive to said control signal and said periodic energization of said first signaling beacon.

13. A method as recited in claim 12, including the further step of
    superimposing a control signal on said perceptible signal.

14. A method as recited in claim 12, including the further step of
    transmitting a control signal separate from said perceptible signal.

15. A method as recited in claim 12, including the further step of
    stabilizing said periodic energization of said perceptible signal source with an external transmitted signal.

16. A method as recited in claim 15, wherein said transmitted signal is a global positioning system (GPS) signal.

17. A method as recited in claim 12, including the further step of
    controlling a parameter of said perceptible signal.

18. A method as recited in claim 12 wherein said communication protocol is one of a plurality of communication protocols, said method comprising the further step of relaying from said second beacon a periodic modulated synchronization signal using a communication protocol which is changed from said communication protocol.

* * * * *